(12) United States Patent
Marasco

(10) Patent No.: US 10,246,911 B2
(45) Date of Patent: Apr. 2, 2019

(54) RECREATIONAL OR UTILITY VEHICLE DOOR OPENING SYSTEM

(71) Applicant: Albert Marasco, Altoona, IA (US)

(72) Inventor: Albert Marasco, Altoona, IA (US)

( * ) Notice: Subject to any disclaimer, the term of this patent is extended or adjusted under 35 U.S.C. 154(b) by 0 days.

(21) Appl. No.: 15/610,899

(22) Filed: Jun. 1, 2017

(65) Prior Publication Data
US 2017/0350171 A1 Dec. 7, 2017

Related U.S. Application Data

(60) Provisional application No. 62/344,433, filed on Jun. 2, 2016.

(51) Int. Cl.
| | |
|---|---|
| *B60P 3/32* | (2006.01) |
| *B60J 5/04* | (2006.01) |
| *E05B 83/22* | (2014.01) |
| *E05B 81/04* | (2014.01) |
| *E05B 81/90* | (2014.01) |
| *E05B 85/06* | (2014.01) |
| *E05B 81/10* | (2014.01) |
| *E05B 81/28* | (2014.01) |
| *E05B 79/20* | (2014.01) |
| *E05B 83/12* | (2014.01) |
| *E05B 47/00* | (2006.01) |

(52) U.S. Cl.
CPC ............ *E05B 83/22* (2013.01); *B60J 5/0491* (2013.01); *B60P 3/32* (2013.01); *E05B 79/20* (2013.01); *E05B 81/04* (2013.01); *E05B 81/10* (2013.01); *E05B 81/28* (2013.01); *E05B 81/90* (2013.01); *E05B 83/12* (2013.01); *E05B 85/06* (2013.01); *E05B 2047/0094* (2013.01)

(58) Field of Classification Search
CPC ... B60P 3/32; B60P 3/34; B60J 5/0491; E05B 83/22; E05B 81/04; E05B 81/10; E05B 81/90; E05B 85/06; E05B 81/16
See application file for complete search history.

(56) References Cited

U.S. PATENT DOCUMENTS

| | | | | |
|---|---|---|---|---|
| 4,906,033 A * | 3/1990 | Sargent | ...................... | B60J 5/00 16/366 |
| 6,000,257 A * | 12/1999 | Thomas | .................. | E05B 81/14 292/201 |
| 7,967,347 B1 * | 6/2011 | Johnson | .................. | E05B 83/12 292/201 |
| 2003/0038504 A1 * | 2/2003 | Crean | ....................... | B60P 3/36 296/156 |
| 2004/0017095 A1 * | 1/2004 | Crean | ....................... | B60P 3/36 296/156 |

(Continued)

*Primary Examiner* — Gregory A Blankenship
(74) *Attorney, Agent, or Firm* — Christopher A. Proskey; BrownWinick Law Firm

(57) ABSTRACT

A recreational or utility vehicle system comprising a motorized member that allows for opening of a cargo door utilizing motorized movement to release the cargo door as well as a manual activation device that allows for opening of the cargo door in a manual and mechanical manner. In one arrangement, the recreational or utility vehicle system provides the convenience of opening the cargo door by a simple press of a button which activates the motorized movement. This arrangement also provides for opening of the cargo door when the motorized member fails or when power is unavailable.

17 Claims, 8 Drawing Sheets

(56) References Cited

U.S. PATENT DOCUMENTS

| | | | |
|---|---|---|---|
| 2004/0261267 A1* | 12/2004 | Crean | B62D 21/02 29/897.2 |
| 2011/0113838 A1* | 5/2011 | Stuckey | E05B 47/0603 70/264 |
| 2011/0282555 A1* | 11/2011 | Kimmet | B60J 5/0491 701/49 |
| 2013/0152643 A1* | 6/2013 | Stuckey | E05B 81/16 70/275 |
| 2017/0350171 A1* | 12/2017 | Marasco | E05B 83/22 |
| 2018/0087298 A1* | 3/2018 | Strole | E05B 81/90 |

* cited by examiner

RECREATIONAL OR UTILITY VEHICLE DOOR OPENING SYSTEM

CROSS-REFERENCE TO RELATED APPLICATIONS

The present application claims priority to U.S. Provisional Patent Application No. 62/344,433 which was filed on Jun. 2, 2016, entitled RV DOOR OPENING SYSTEM which is hereby incorporated by reference herein in its entirety, including any figures, tables, or drawings or other information.

FIELD OF THE DISCLOSURE

This disclosure relates to Recreational Vehicles (also known as RVs) and utility vehicles. More specifically, and without limitation, this disclosure relates to a door opening system for RVs and utility vehicles.

BACKGROUND OF THE DISCLOSURE

RVs are well known. RVs come in an endless array of sizes, shapes and configurations and are designed to serve various needs. Some RVs are relatively small and are configured for relatively short trips such as camping on the weekends; whereas other RVs are relatively large and are configured for long haul excursions and to serve as a long term home on the road.

Regardless of the configuration or intended purpose of the RV, with improvements in technology and advanced manufacturing processes, the trend is that RVs are becoming increasingly sophisticated and increasingly motorized. That is, more and more systems on an RV are transitioning from manually controlled mechanical systems to electronically controlled motorized systems. Examples of these systems include power door locks, power windows, power seats, power mirrors, power awnings, and the like, just to name a few.

While motorizing various systems of RVs certainly provides convenience and ease of use, one substantial drawback to motorizing these systems is that motorized systems are only functional when the RV is in a powered state (when power is available, when the batteries have a charge, when the generator is operational, and/or when the electrical system is functional). In contrast, when the RV is in an unpowered state (when no power is available, when the batteries have died, when the generator is not functioning, and/or when an electrical system failure has occurred) which tends to occur on a rather frequent basis due to the unique nature and use of RVs, the convenience of these powered systems becomes a substantial disadvantage as the powered systems are inoperable until power is restored.

Inoperability is only a minor inconvenience for many systems of an RV, such as power windows, power seats, power door locks, power awnings and the like. However, for other systems, inoperability is a substantial inconvenience if not a significant problem.

As an example, many RVs include a plurality of cargo doors that cover cargo holds in the side or undercarriage of the RV. Conventionally, these cargo doors include a mechanical handle mechanism connected to a latch mechanism that is used to manually unlatch and open the cargo door. While this arrangement is effective, there are a substantial number of disadvantages to using a visible handle mechanism in cargo doors of RVs.

One disadvantage to using a handle mechanism in a cargo door is that including a handle mechanism in the cargo doors requires placing an opening in the cargo door. Placing an opening in the cargo door increases manufacturing steps, manufacturing costs and manufacturing complexity. As such, placing a hole in the cargo door for a handle mechanism increases the costs of the cargo door.

Another disadvantage to placing a hole in the cargo door is that including a hole in the cargo door tends to weaken or lessen the structural integrity of the cargo door. That is, said another way, a cargo door without a hole for a handle mechanism therein tends to be stronger, more durable, and therefore generally has a longer useful life than a cargo door with a hole for a handle mechanism.

Another disadvantage to placing a hole in the cargo door is that this hole has a tendency to create weak spots in the cargo door and/or this hole has a tendency to focus stresses on particular portions of the cargo door, such as in corners of the cargo door hole. This can lead to premature cracking or failure of the cargo door. To prevent this from happening, the cargo door may require sophisticated designs and/or sophisticated manufacturing steps. Again, this complexity increases the cost of manufacturing the cargo door.

Another disadvantage to placing a hole in the cargo door is that this hole provides an entry way for water and contaminants to enter the cargo hold. Accordingly, steps must be taken to prevent water and contaminants from entering the cargo hold through this hole, such as sealing the handle mechanism to the cargo door. To prevent this from happening, the cargo door may require sophisticated designs and/or sophisticated manufacturing steps and/or additional assembly steps and/or parts (such as the use of sealants or gaskets or the like). Again, this complexity increases the cost of manufacturing the cargo door.

Another disadvantage to using a handle mechanism in a cargo door is that the handle mechanisms themselves tend to be costly as they must be designed to withstand the elements. This requires the handle mechanisms to be made from premium materials, which are expensive, such as stainless steel or have premium coatings, such as being plated or anodized or painted. Despite these efforts, due to the harsh environment of use, and due to being exposed to the elements, the handle mechanisms tend to age rapidly which often leads to early replacement and/or failure of the handle mechanism.

Another disadvantage to using a handle mechanism in a cargo door is that often the opening in the cargo door is specific to the configuration of the handle mechanism. Due to the low volume production runs of RVs relative to automobiles or trucks, RV manufacturers have relatively low purchasing power when it comes to dictating the design of the handle mechanisms. As such, handle mechanism manufacturers often change handle mechanism designs, or eliminate the manufacture of various handle mechanisms altogether, without regard to the effect this will have on the RV manufacturers or RV owners. This may require RV manufacturers to redesign their cargo doors that are configured for a specific handle mechanism. This may also lead to obsoleting and/or discarding previously manufactured cargo doors if the matching handle mechanism is no longer available.

Another disadvantage to using a handle mechanism in a cargo door is that many RV cargo door designs warp around the door handle mechanism because the handle mechanism is tightened in placed. This causes an interdependency between the hole cutout in the cargo door and the handle mechanism. As such, if the RV manufacturer wants to switch from one handle mechanism design to another, it typically requires a different cutout and therefore a different cargo door design. This interdependency may cause a barrier to change to better handle mechanism designs and often leads to continued use of suboptimal parts, well after better alternatives are available, for historical reasons.

Another disadvantage to including a handle mechanism in a cargo door of an RV is that the presence of a large handle mechanism in the cargo doors tends to create an unattractive aesthetic appearance. This is exasperated when a plurality of handle mechanisms is present in the side of an RV. Another substantial disadvantage of including a handle mechanism in the cargo door is that conventionally many RVs, and therefore many RV cargo doors, go through complicated, multi-layered, multi-colored painting applications. As such, if and when a handle mechanism needs to be replaced, matching the handle mechanism to the multi-layered, multi-colored paint scheme becomes a substantial challenge, and therefore a substantial inconvenience and a substantial expense. In addition, due to the relatively low production runs of any one type of RV, finding parts (such as a particular handle mechanism) also becomes a substantial inconvenience and expense.

These problems are often exasperated by the fact that most RVs have a number of cargo doors in each side of the RV. As such, these problems are often repeated many times over for each RV.

For these reasons, it is desirable to eliminate the handle mechanism so as to avoid these disadvantages. One way to eliminate the mechanical handle mechanism is to motorize the opening and closing of these cargo doors.

One substantial disadvantage to motorizing cargo doors is in the event of a power-out situation (an unpowered state), the cargo doors are inoperable making it impossible to access the contents of the cargo holds behind the closed cargo doors. This may cause a substantial inconvenience if not a significant problem. Being unable to open the cargo doors and access the contents of the cargo holds may prevent access to the occupants' luggage, may prevent access to the tools needed to repair the RV, this may even prevent access to the systems of the RV that must be repaired, among countless other disadvantages.

As an example, on many RVs, the battery system that provides power to the RV is positioned within a cargo hold which is only accessible by opening a cargo door. When a problem occurs with the battery system, such as the batteries die, the cargo hold must be accessed, via the cargo door, to fix or replace the battery system thereby restoring power to the RV. However, it is a substantial problem if power is required to operate the cargo door to access the cargo hold, yet access to the cargo hold is required to restore power to the RV. In this example, the problem prevents the solution, which is untenable.

In addition to being convenient, motorizing the cargo doors and providing a simple switch or button to open the cargo doors, makes it easier for people with manual dexterity issues (such as those suffering from arthritis), people with disabilities and the elderly to use RVs. Ease of use of cargo doors on RVs is important as a large segment of RV users are retirees, who often suffer from physical afflictions, have limited mobility or reduced dexterity. In view of these sensitivities, it is doubly important to provide easy access to the cargo hold even when a problem occurs, such as a power outage.

Therefore, there is a need in the art to solve these problems.

Thus, it is a primary object of the disclosure to provide an RV door opening system that improves upon the state of the art.

Another object of the disclosure is to provide an RV door opening system that is easy to use.

Yet another object of the disclosure is to provide an RV door opening system that improves access to the cargo hold.

Another object of the disclosure is to provide an RV door opening system that operates in a powered and unpowered state.

Yet another object of the disclosure is to provide an RV door opening system that provides security.

Another object of the disclosure is to provide an RV door opening system that provides ease of access.

Yet another object of the disclosure is to provide an RV door opening system that provides an improved aesthetic appearance.

Another object of the disclosure is to provide an RV door opening system that eliminates the conventional mechanical handle mechanism.

Yet another object of the disclosure is to provide an RV door opening system that eliminates the need for a handle mechanism in the cargo door.

Another object of the disclosure is to provide an RV door opening system that eliminates costly parts.

Yet another object of the disclosure is to provide an RV door opening system that is safe to use.

Another object of the disclosure is to provide an RV door opening system that eliminates the need for a hole in the cargo door.

Yet another object of the disclosure is to provide an RV door opening system that provides a unique solution.

Another object of the disclosure is to provide an RV door opening system that is efficient to use.

Yet another object of the disclosure is to provide an RV door opening system that improves manufacturability.

Another object of the disclosure is to provide an RV door opening system that is cost effective.

Yet another object of the disclosure is to provide an RV door opening system that is durable.

Another object of the disclosure is to provide an RV door opening system that is robust.

Yet another object of the disclosure is to provide an RV door opening system that can be used with a wide variety of cargo doors.

Another object of the disclosure is to provide an RV door opening system that can be used with a wide variety of RVs.

Yet another object of the disclosure is to provide an RV door opening system that is relatively inexpensive.

Another object of the disclosure is to provide an RV door opening system that has a long useful life.

Yet another object of the disclosure is to provide an RV door opening system that is high quality.

Another object of the disclosure is to provide an RV door opening system that is convenient.

Yet another object of the disclosure is to provide an RV door opening system that eliminates the need for costly repairs.

Another object of the disclosure is to provide an RV door opening system that allows for interchangeability of parts.

Yet another object of the disclosure is to provide an RV door opening system that reduces the cost to manufacture a cargo door.

Another object of the disclosure is to provide an RV door opening system that reduces the steps to manufacture a cargo door.

These and other objects, features, or advantages of the present disclosure will become apparent from the specification, figures and claims.

SUMMARY OF THE DISCLOSURE

An RV or utility vehicle door opening system is presented that includes a motorized member that allows for opening of a cargo door utilizing motorized movement to release the cargo door as well as a manual activation device that allows for opening of the cargo door in a manual and mechanical manner. This arrangement provides the convenience of opening the cargo door by a simple press of a button which activates the motorized movement. This arrangement also provides for opening of the cargo door when the motorized member fails or when power is not available.

DETAILED DESCRIPTION OF THE DISCLOSURE

Figure 1:
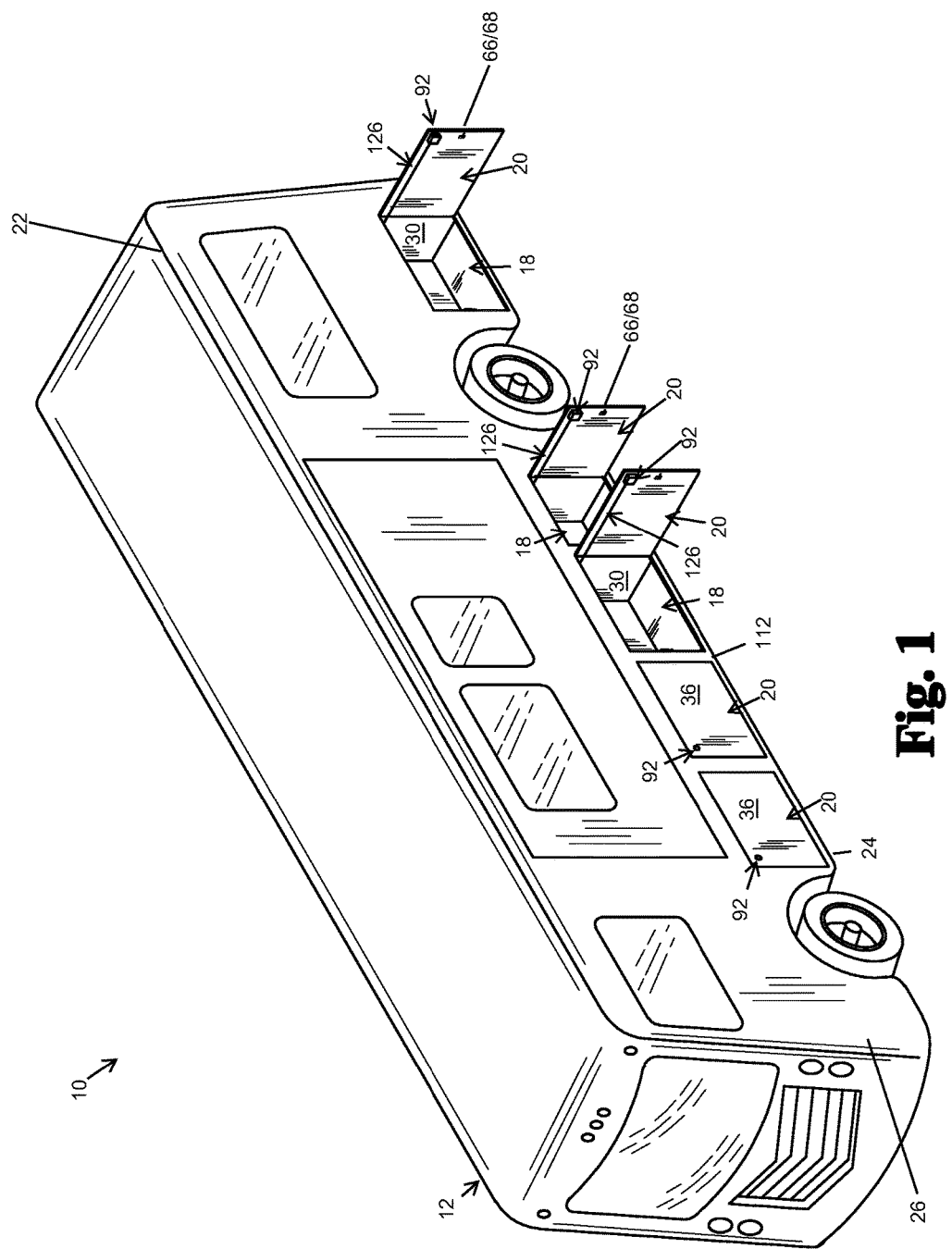
FIG. 1 is a front perspective view of a recreational vehicle which comprises a plurality of cargo holds and cargo doors.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure(s). The following detailed description is, therefore, not to be taken in a limiting sense, and the scope of the disclosure(s) is defined only by the appended claims, along with the full scope of equivalents to which such claims are entitled.

As used herein, the terminology such as vertical, horizontal, top, bottom, front, back, end, sides and the like are referenced according to the views, pieces and figures presented. It should be understood, however, that the terms are used only for purposes of description, and are not intended to be used as limitations. Accordingly, orientation of an object or a combination of objects may change without departing from the scope of the disclosure.

Also, as used herein, the term "RV" or similar language is to be broadly construed to describe a recreational vehicle as well as any other vehicle having cargo holds that includes cargo doors therein.

With reference to the figures, an RV door opening system 10 (system 10) is presented. System 10 is formed of any suitable size, shape and design. In the arrangement shown, as one example, system 10 includes an RV 12 having a body 14 with an exterior sidewall 16, at least one cargo hold 18 which is covered by at least one cargo door 20.

RV 12 is formed of any suitable size, shape and design. In the arrangement shown, as one example, RV 12 includes a body 14 having generally flat exterior sidewalls 16 that extend from an upper end 22 to a lower end 24 and from a forward side 26 to a rearward side 28. One or more cargo holds 18 are positioned in the lower portion of body 14, at, near, adjacent, or in the lower end 24 of sidewall 16. Alternatively, cargo holds 18 are positioned in any portion of body 14 of RV 12.

Cargo hold 18 is formed of any suitable size, shape and design. In one arrangement, cargo hold 18 is a generally open area that serves to provide an accessible space for the storage of cargo, luggage, tools, equipment and the like needed for use of the RV 12. In one arrangement, cargo hold 18 serves to provide space and to house various systems necessary for the operation of RV 12 such as battery systems, plumbing systems, electrical systems, hydraulic systems, generator systems and the like to name a few. In the arrangement shown, cargo hold 18 includes a generally open area 30 configured to house systems or cargo surrounded by a peripheral edge 32 that serves as a boundary to the open area 30 of cargo hold 18. In the arrangement shown, peripheral edge 32 includes a sealing member that is configured to engage cargo door 20 when in a closed position so as to prevent the entry of water, dust, dirt and other contaminants into cargo hold 18 when the RV 12 is driving down the road or otherwise in operation.

Cargo door 20 is formed of any suitable size shape and design and is configured to move between an open position, where access is provided cargo hold 18, and a closed position, where the cargo hold 18 is covered by cargo door 20 and access to cargo hold 18 is blocked. In the arrangement shown, as one example, cargo door 20 is generally planar in shape and includes an exterior surface 36 and an interior surface 38 that extends in approximate parallel spaced relation to one another thereby forming the generally planar shape of the cargo door 20, however any other shape is hereby contemplated. In the arrangement shown, as one example, cargo door 20 includes a forward edge 40, a rearward edge 42, an upper edge 44 and a lower edge 46; wherein forward edge 40 and rearward edge 42 extend in approximate parallel spaced relation to one another; wherein the upper edge 44 and lower edge 46 extend in approximate parallel spaced relation to one another; wherein the forward edge 40 and rearward edge 42 and the upper edge 44 and lower edge 46 extend in approximate perpendicular alignment to one another thereby forming a generally square or rectangular shape, however any other shape is hereby contemplated for use.

Cargo door 20 is connected to cargo hold 18 and/or body 14 by any manner, method or configuration. In one arrangement, cargo door 20 is connected to cargo hold 18 and/or body 14 by a hinge mechanism 48. Hinge mechanism 48 is formed of any suitable size, shape and design and serves to connect cargo door 20 to RV 12 while allowing for opening and closing of cargo door 20. In one arrangement, hinge mechanism 48 is formed of one or more hinges having a pair of leafs that rotatably connected to one another by a plurality of barrels that receive a hinge pin therein and there through (that defines an axis of rotation) that rotatably and/or pivotally connect cargo door 20 to cargo hold 18 and/or body 14. However any other form of a hinge mechanism 48 is hereby contemplated for use, such as a flexible piece of material or the like. In the arrangement shown, hinge mechanism 48 connects adjacent the forward edge 40 of cargo door 20 and adjacent the forward edge of cargo hold 18, however any other arrangement is hereby contemplated for use, such as connecting to the upper edge 44, the lower edge 46, the rearward edge 42, the interior surface 38, the exterior surface 36 or any other portion or position of cargo door 20 to any portion or position of cargo hold 18 and/or body 14.

In an alternative arrangement, instead of pivoting on cargo hold 18 and/or cargo body 14 by hinge mechanism 48, cargo door 20 opens by way of a sliding mechanism arrangement such as a sliding door, or a similar arrangement to that seen on many minivans. Alternatively, cargo door 20 is connected to and opens and closes with respect to cargo hold 18 and/or body 14 by any other manner, method or means.

Cargo door 20 is also connected to cargo hold 18 and/or body 14 by an opening/closing system 58. Opening/closing system 58 is formed of any suitable size, shape and design and serves to assist with opening and closing of cargo door 20. In one arrangement, as one example, opening/closing system 58 is formed of one or more hydraulic or pneumatic pistons that connect on one end to cargo door 20 and connect on an opposite end to cargo hold 18 and/or body 14. In this arrangement, cargo hold 18 and/or body 14 helps to open and close cargo door 20 in a controlled manner as well as help to keep cargo door 18 in an open position when desired. In an alternative arrangement, opening/closing system 58 may be formed of one or more springs or a spring system.

A latch mechanism 60 operably connects cargo door 20 and cargo hold 18 and/or body 14. Latch mechanism 60 is formed of any suitable size, shape and design and serves to latch cargo door 20 in a closed position and hold cargo door 20 in a closed position until operated, either manually or by motorization, to unlatch cargo door 20. In one arrangement, as one example, as is shown, latch mechanism 60 includes a body 62 having an opening 64 that is configured to receive a post 66 of a post mechanism 68. Opening 64 is selectively closed by tongue 70 that moves between a latched position and an unlatched position. In the latched position, post 66 of post mechanism 68 is held within opening 64 and is prevented from escaping, thereby holding cargo door 20 in a closed position. In the unlatched position, post 66 of post mechanism 68 is allowed out of opening 64 so as to allow cargo door 20 to be opened. In one arrangement, tongue 70 pivots upon a pivot point to move between a locked and unlocked position.

Post mechanism 68 is formed of any suitable size, shape and design and is configured to attach post 66 either to the cargo door 20 or the cargo hold 18 and/or body 14 of RV 12. In the arrangement shown, post mechanism 68 connects to the cargo door 20 when the latch mechanism 60 is connected to the cargo hold 18 and/or body 14 of RV 12. However the opposite arrangement is hereby contemplated for use. That is, where the latch mechanism 60 is connected to the cargo door 20 and the post mechanism 68 is connected to the cargo hold 18 and/or body 14 of RV 12. Either arrangement is functional and hereby contemplated for use, as is an arrangement utilizing multiple latch mechanisms 60 and corresponding post mechanisms 68.

A lever mechanism 72 is operatively connected to tongue 70 and is configured to move or operate tongue 70 and serves to release tongue 70 when tongue 70 is in a closed or latched position. In one arrangement, lever mechanism 72 pivots upon a pivot point 76 to move between a locked and unlocked position.

A motorized member 78 is operatively connected to lever mechanism 72 and is configured to move or operate lever mechanism 72 which serves to move or operate tongue 70 and serves to release tongue 70 when tongue 70 is in a closed or latched position. Motorized member 78 is any electro-mechanical device that is capable of operating lever mechanism 72 and/or tongue 70 such as a linear actuator, a solenoid, an electro-magnetic device, a pneumatic member, a hydraulic member, or the like. In one arrangement, as is shown, motorized member 78 is a linear actuator having a body that contains an electric motor therein. When activated, the electric motor moves a movable nose 84 either closer to or away from the electric motor by way of a moveable member, such as a threaded shaft or a pushrod or the like. Movable nose 84 is operatively connected to lever mechanism 72 and/or tongue 70 either directly or by way of an intermediary device such as a linkage or a cable or the like that translates movement of nose 84 to operate lever mechanism 72 and/or tongue 70. As one example, when moveable nose 84 is moved closer to an electric motor, the end of lever mechanism 72 is pulled toward motorized member 78 causing lever mechanism 72 to pivot upon a pivot point thereby causing activation or movement of tongue 70 (that is, tongue 70 opens opening 64). As another example, when moveable nose 84 is moved away from the electric motor, the end of lever mechanism 72 is pushed away from motorized member 78 causing lever mechanism 72 to pivot upon pivot point 76 thereby causing activation or movement of tongue 70 (that is, tongue 70 closes opening 64). Any other arrangement is hereby contemplated for use to open and/or close lever mechanism 72 and/or tongue 70.

The electric motor of motorized member 78 is electrically connected to an activation device 92 by one or more electrical leads 94. Activation device 92 is formed of any device that activates and/or deactivates and/or controls operation of motorized member 78. In one arrangement, activation device 92 is a button 96 which when pressed activates motorized member 78 to open latch mechanism 60 thereby allowing cargo door 20 to be opened.

Figure 2:
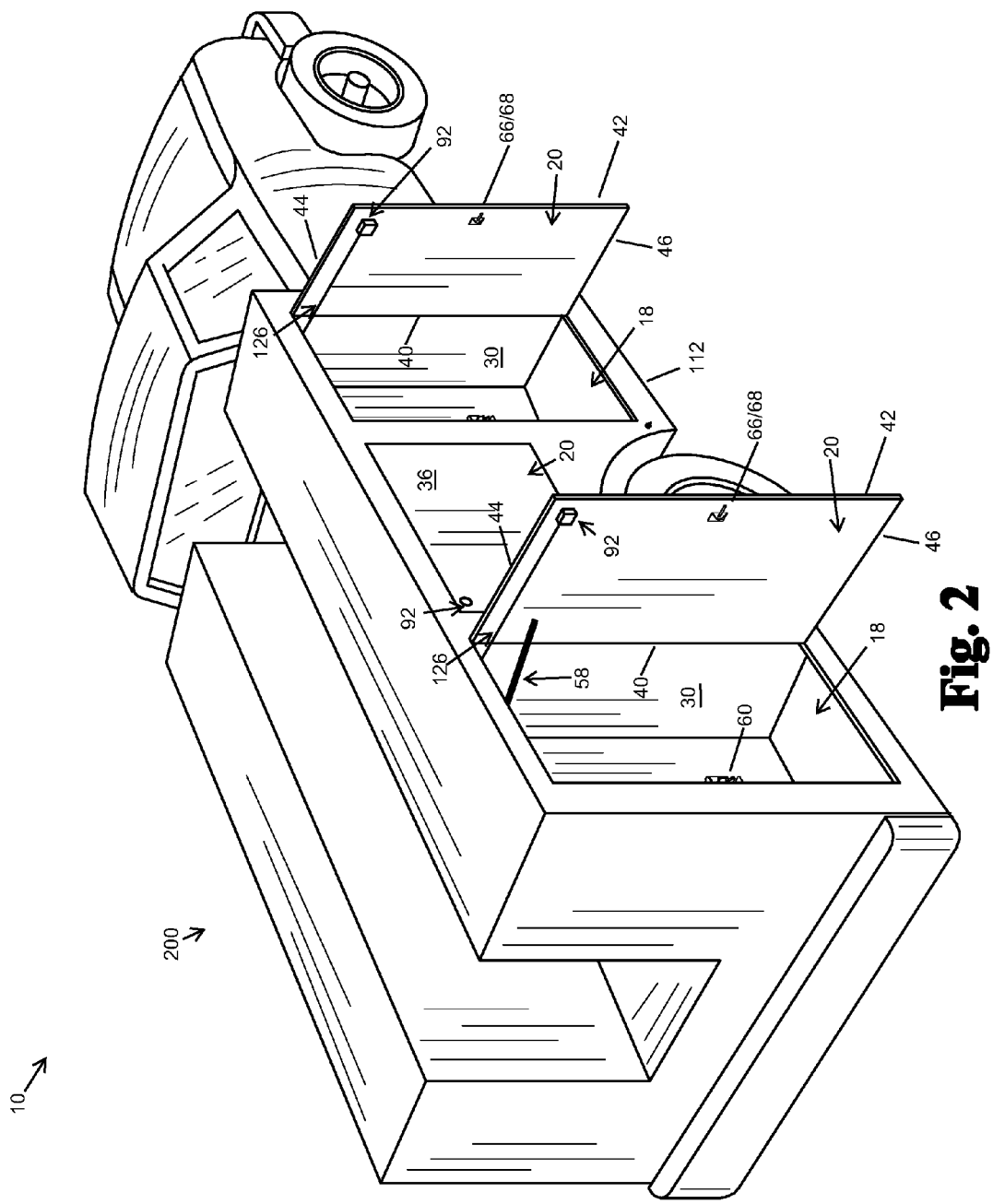
FIG. 2 is rear perspective view of a utility vehicle which comprise a plurality of cargo holds and cargo doors.
Figure 3:
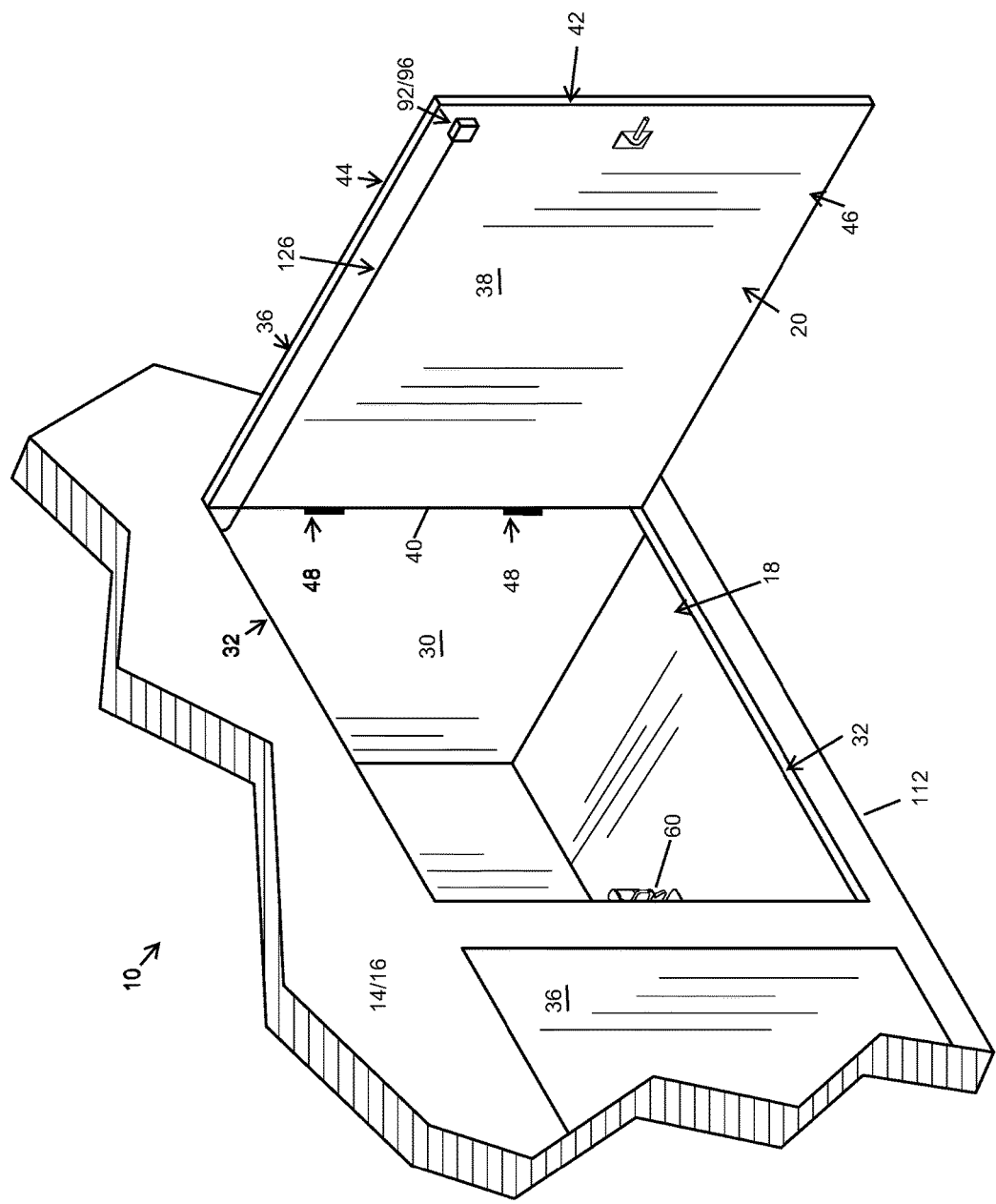
FIG. 3 is an exploded view of a cargo hold and a cargo door.
Figure 5:
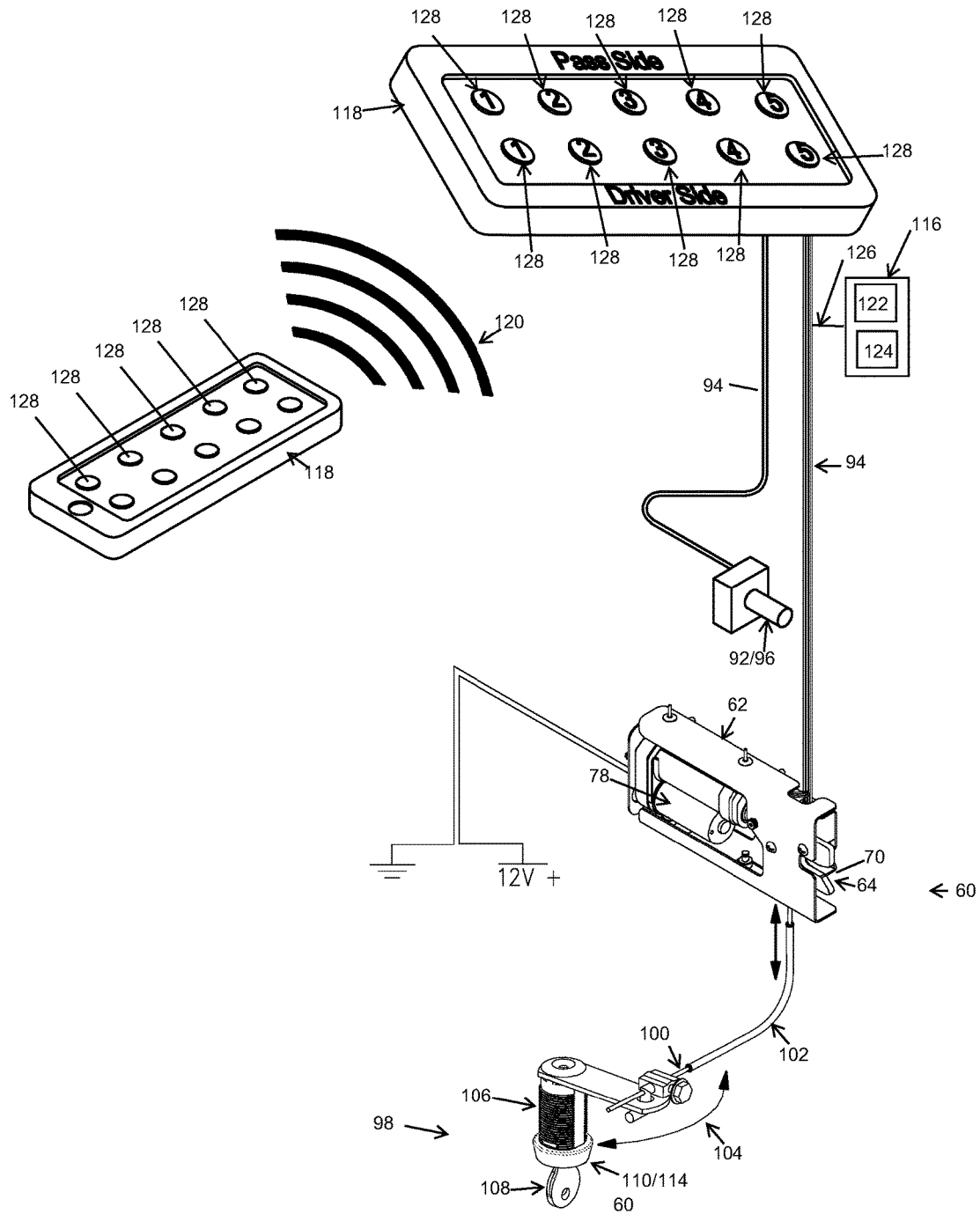
FIG. 5 is a close-up perspective view which demonstrates how the latch mechanism is capable of being controlled by a remote control device and a wireless control signal.
Figure 6:
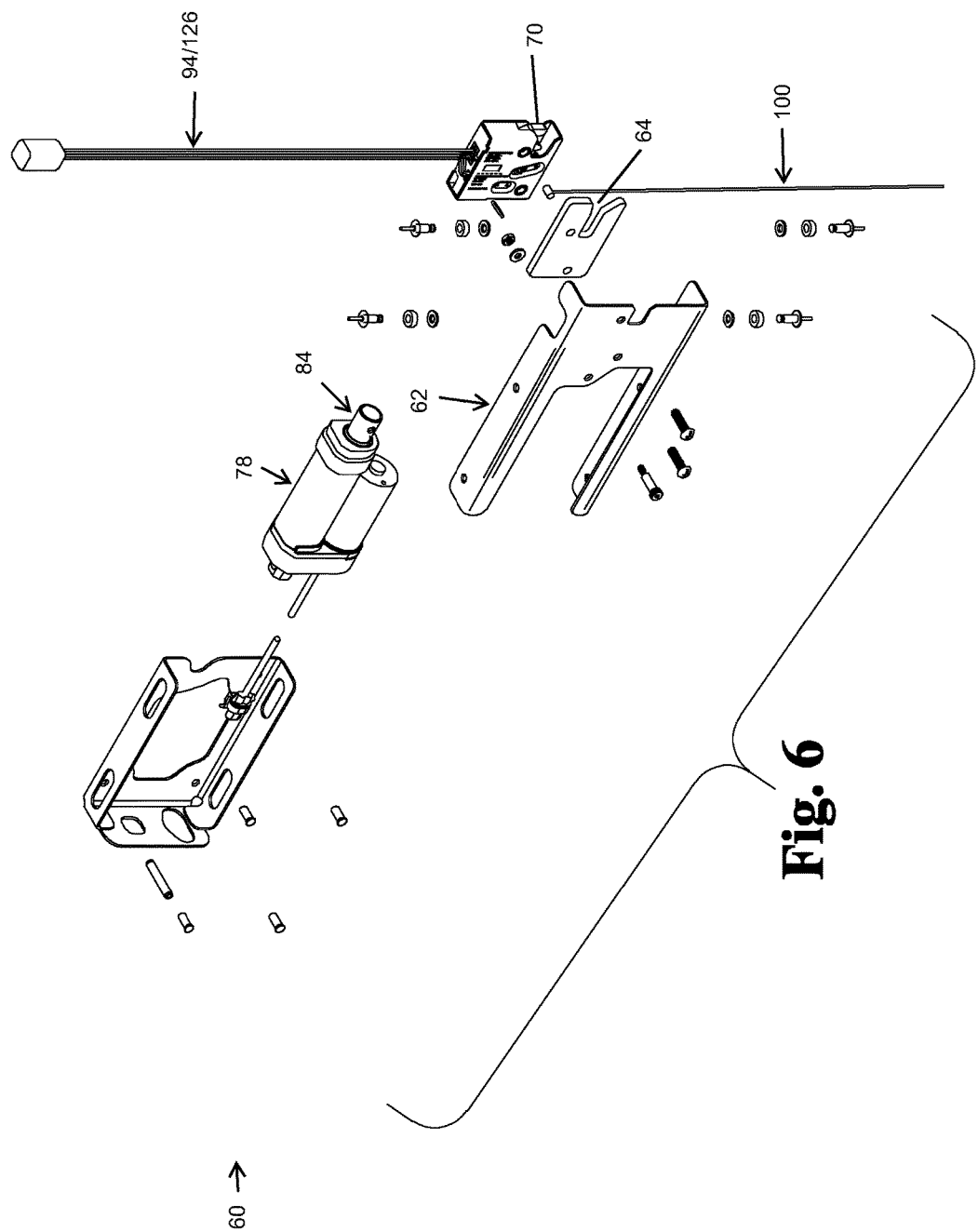
FIG. 6 is a close-up perspective view of the elements of the latch mechanism.
Figure 7:
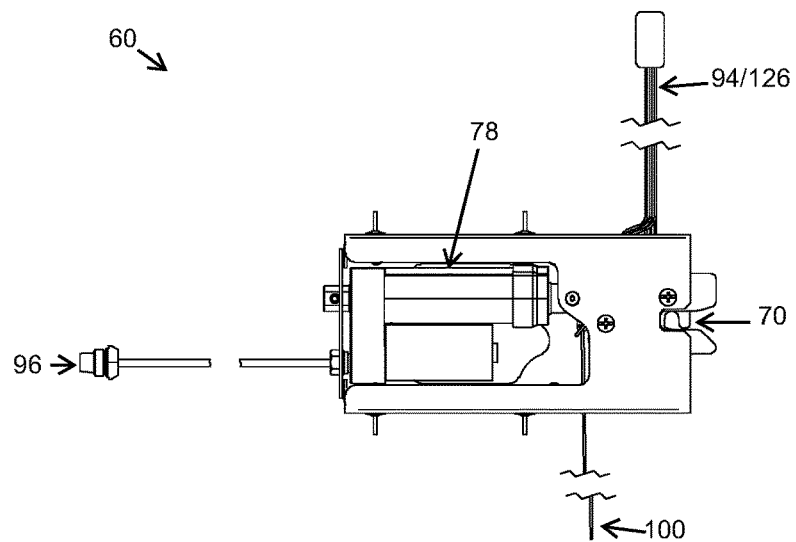
FIG. 7 is a side perspective view of the latch mechanism.
Figure 8:
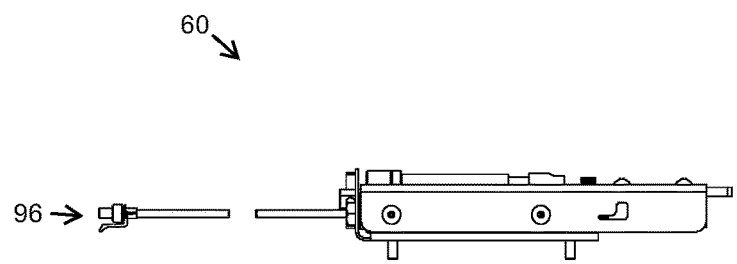
FIG. 8 is a top perspective view of the latch mechanism.
Figure 9:
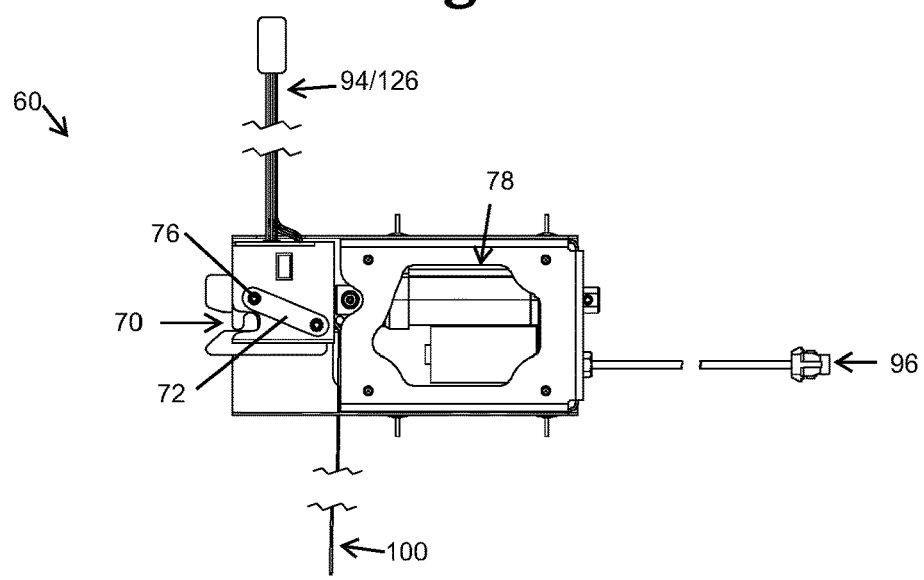
FIG. 9 is a side perspective view of the latch mechanism.
Figure 10A:
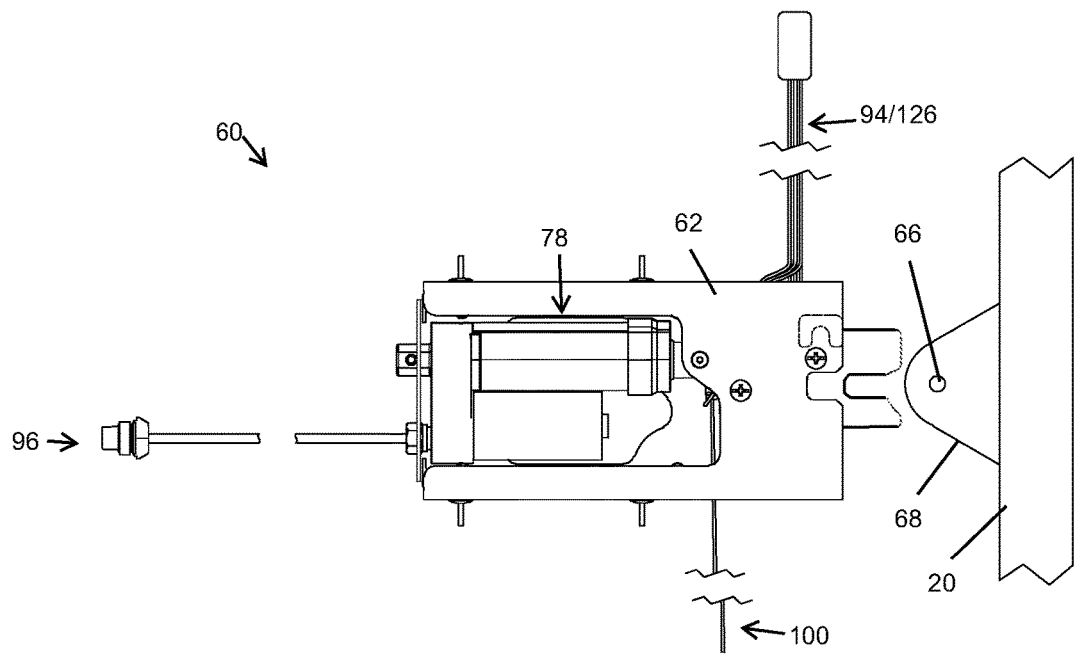
FIG. 10A is a side perspective view of the latch mechanism in the "ready/extended" position.
Figure 10B:
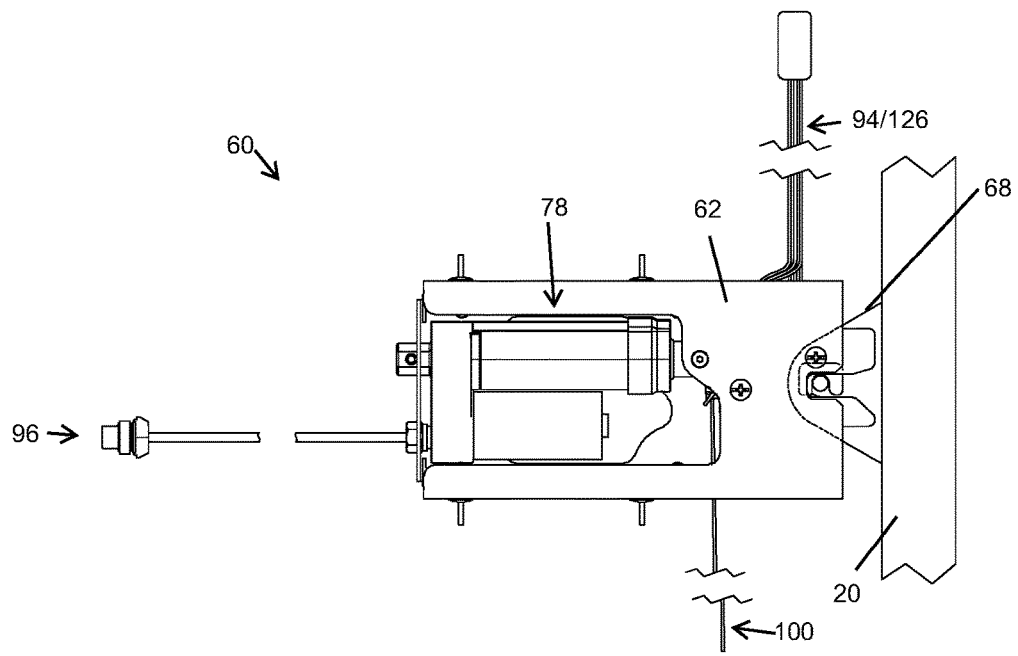
FIG. 10B is a side perspective view of the latch mechanism in the retracted position.

Activation device 92 may be placed in any portion of RV 12 and/or its body 14. In one arrangement, as one example, button 96 is placed in the body 14 of RV 12 adjacent cargo door 20. As an example, button 96 is placed in sidewall 16 of body 14 just above or just next to cargo door 20, so as to provide convenience for opening of cargo door 20. In this arrangement, the exterior surface of button 96 faces outward from sidewall 16 and is easily accessed by a user. In an alternative arrangement, button 96 is positioned in cargo door 20 itself (as is shown in FIGS. 1 and 2). In an alternative arrangement, button 96 is positioned in any other portion of RV 12, such as in the cab or cockpit such that the driver or other occupant can easily access and operate the button 96, or in any other part or portion of RV 12. By placing the button 96 remote to the cargo door 20, such as in the cockpit of the RV 12, this provides additional security and control over the operation of button 96 and prevents unintended persons from opening the cargo door 20 by using button 96. In yet another alternative arrangement, as is shown in FIG. 5, a button 96 may be placed remote to the cargo door 20, such as in the cockpit of the RV 12, as well as a button 96 being placed in the body 14 of RV 12 or in the cargo door 20 itself which provides the ability to control operation of the cargo door 20 from the remote location, such as the cockpit of the RV 12 as well as the operation of the cargo door 20 at the location of the cargo door 20 itself. This provides additional convenience of use. In one arrangement, the button 96 in the body 14 of RV 12 or in the cargo door 20 itself can be disabled while allowing the button 96 located at a remote location, such as in the cockpit of the RV 12, to control operation of the cargo door 20.

A manual override system 98 is also connected to latch mechanism 60. Manual override system 98 is formed of any suitable size, shape and design and is configured to operate or unlatch latch mechanism 60 in a manual and unpowered manner. The addition of manual override system 98 allows for operation of latch mechanism 60 when RV 12 is in an unpowered state or when a malfunction has occurred to motorized member 78 or electrical system of RV 12. In one arrangement, as is shown, manual override system 98 is formed of a cable 100 which is surrounded by a sheath 102, such that the cable 100 is moveable within sheath 102.

One end of cable 100 is connected to lever mechanism 72, which may or may not be the same lever mechanism 72 that motorized member 78 is connected to and operates. In an alternative arrangement, latch mechanism 60 includes a second or separate lever mechanism for manual override system 98 to connect to such that manual override system 98 and motorized member 78 do not share the same lever mechanism. Alternatively, it is hereby contemplated that manual override system 98 is operably connected to latch mechanism 60 by any other manner or means.

The opposite end of cable 100 is connected to a manual activation device 104. Manual activation device 104 is formed of any suitable size, shape and design and is configured to unlatch the latch mechanism 60 in a manual or mechanical manner without the use of electric power. In one arrangement, manual activation device 104 includes a lock mechanism 106 that is operable by a key 108 that is inserted into an opening in the face 110 of the lock mechanism 106. Lock mechanism 106 and face 110 may be placed in any portion of RV 12 and/or its body 14.

In one arrangement, manual activation device 104/lock mechanism 106 is positioned adjacent the cargo door 20 itself in the body 14 of the RV 12. In another arrangement, manual activation device 104/lock mechanism 106 is positioned in the cargo door 20 itself. While these arrangements are convenient, these arrangements suffer from the deficiencies that the manual activation device 104/lock mechanism 106 disrupts the aesthetic appearance of the cargo door 20 or body 14 and the manual activation device 104/lock mechanism 106 is subject to the complex painting scheme of the cargo door 20 or body 14, it increases the complexity of the cargo door 20 or body 14, it increases the cost of the cargo door 20 or body 14, it tends to reduce the strength of the cargo door 20 or body 14, it requires a hole in the cargo door 20 or body 14, it increases the manufacturing steps for the cargo door 20 or body 14, among other disadvantages.

Figure 4:
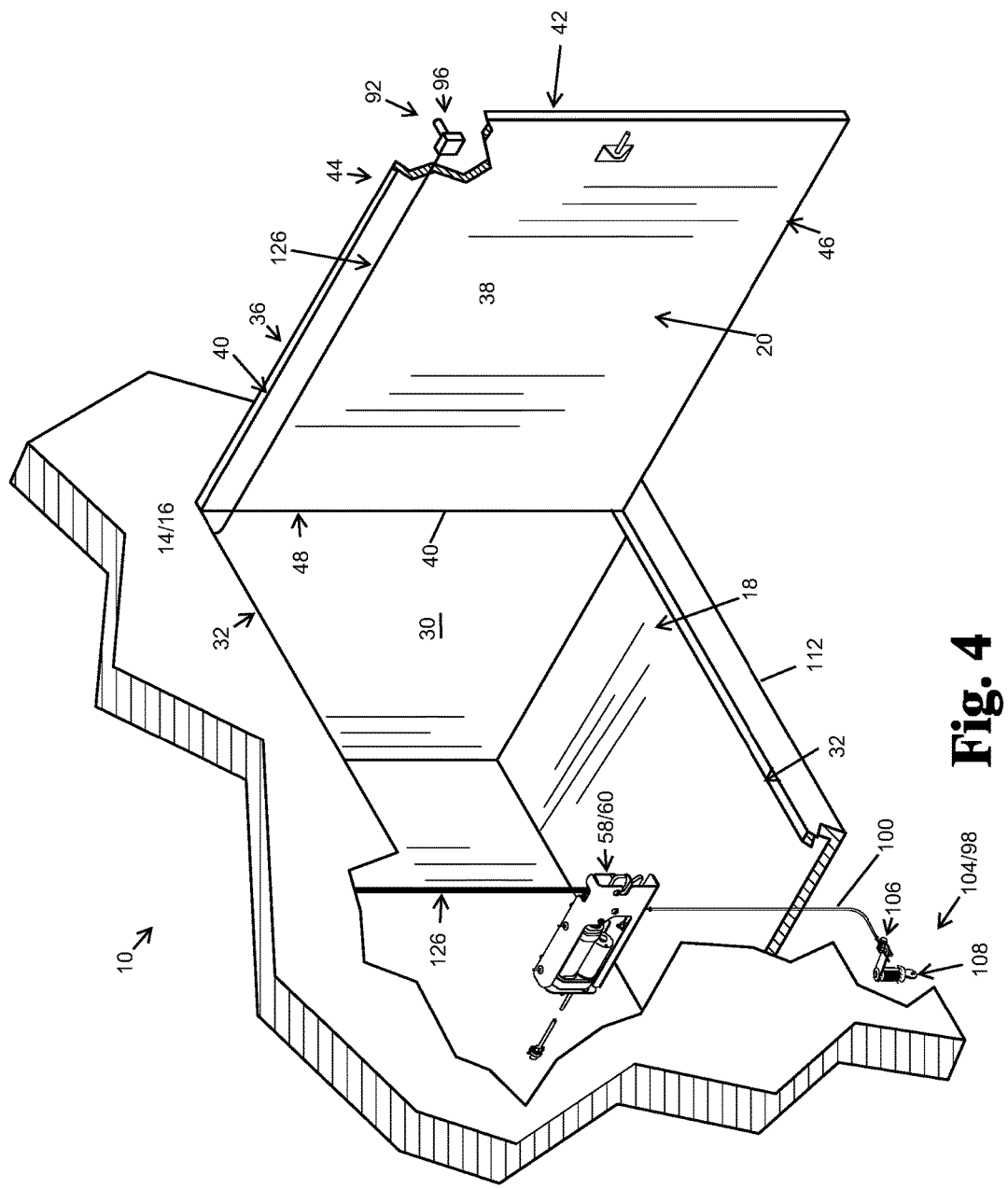
FIG. 4 is an exploded view of a cargo hold and a cargo door which further comprises a latch mechanism.

In an alternative arrangement, to provide convenient access to manual activation device 104, while not disrupting the aesthetic appearance of the RV 12 or increasing the cost or complexity of the cargo door 20, the face 110 of lock mechanism 106 is hidden from view. That is, the face 110 of lock mechanism 106 is not positioned in the sidewall 16 of RV 12 where it is visible and in plain view. Instead, as is shown in FIGS. 4 and 5, the face 110 of lock mechanism 106 is positioned in an underside 112 of RV 12 and out of plain view. In one arrangement, the face 110 of lock mechanism is positioned in a downward facing manner under cargo hold 18 and just inward from cargo door 20. In the arrangement shown in FIGS. 4 and 5, the face 110 of the lock mechanism 106 is placed in the bottom surface of the floor board of the underside 112 of RV 12. In this arrangement, the face 110 of lock mechanism 106 may be placed in the edge 32 of cargo hold 18 or attached to any portion of the underside 112 of RV 12. In an alternative arrangement, lock mechanism 106 is positioned within a downward facing and overhanging portion of cargo door 20 and the face 110 of lock mechanism 106 faces downward from a lower edge 46 of cargo door 20, which is out of plain view.

In one arrangement, it is desirable to place manual activation device 104, or as an example the face 110 of lock mechanism 106 in a downward facing position in the underside 112 of RV 12 so as to avoid disrupting the aesthetic appearance of the RV 12 as well as eliminating parts that must match the often sophisticated painting scheme of the RV 12. However, this configuration also has substantial disadvantages. Namely, being exposed to the underside 112 of RV 12 and having a downward facing face 110 has the tendency to force water, dirt, dust, water, salt and other road contaminants into the manual activation device 104 which can serve to prevent operation of the manual activation device 104 (e.g. the lock mechanism 106 fills with dirt and therefore will not operate) or can lead to early or premature failure (e.g. so much road salt gets into the lock mechanism 106 that it rusts into a state of inoperability). To prevent this from occurring, manual activation device 104 is covered by a removable cover 114. Cover is formed of any suitable size, shape and design and serves to cover and seal the exposed surfaces of manual activation device 104 from contaminants such as water, salt and dirt. When the cover 114 is in place over manual activation device 104, the cover 114 is removed before inserting key 108 into face 110 of lock mechanism 106. Once manual activation device 104 is used, the cover 114 is replaced over the face 110 of lock mechanism 106 and continues to protect the exposed surfaces of manual activation device 104. In one arrangement, the cover 114 may be a plastic cap or cover that connects to the face 110 of lock mechanism 106 and seals it when in place. In another arrangement, the cover 114 may be a piece of tape that adheres to the face 110 of the lock mechanism and seals it when in place.

In one arrangement, which has been tested with success, the manual activation device 104/lock mechanism 106 is positioned in the body 14 of RV 12 remote from the cargo door 20 and hidden from view (except when looking under the RV 12). That is, the manual activation device 104/lock mechanism 106 is not positioned in the sidewall 16 of body 14 of RV 12. Nor is the manual activation device 104/lock mechanism 106 placed in or protrudes through the exterior surface of the cargo door 20 itself.

This means, that the presence of the manual activation device 104/lock mechanism 106 does not affect the aesthetic appearance of the RV 12. This also means that the presence of the manual activation device 104/lock mechanism 106 does not affect the aesthetic appearance of the cargo door 20. In addition, this means that the manual activation device 104/lock mechanism 106 does not need to be painted or matched to the exterior color scheme of the exterior surface of the RV 12. In addition, this means that there does not need to be any design considerations in the sidewall 16 of RV 12, or the cargo door 20 to accommodate the manual activation device 104/lock mechanism 106, which simplifies the design of these components. By hiding the manual activation device 104/lock mechanism 106 from plain view, this allows the design of the RV 12 and cargo door 20 to be simplified. By hiding the manual activation device 104/lock mechanism 106 from plain view this allows the manufacturing process for the RV 12 and cargo door 20 to be simplified. As such, by hiding the manual activation device 104/lock mechanism 106 remote to the cargo door 20 this simplifies the cargo door 20 and reduces the cost of the cargo door 20. Also, by hiding the manual activation device 104/lock mechanism 106 out of plain view, such as in the underside 112 of RV 12, persons unfamiliar with the RV would not have reason to know the manual activation device 104/lock mechanism 106 exists and therefore this remote and hidden location reduces or eliminates tampering with the manual activation device 104/lock mechanism 106 which increases security.

By placing the manual activation device 104/lock mechanism 106 remote to the cargo door 20 to which it opens, this reduces the cost of the cargo door 20. That is, the cargo door 20 does not need to include any mounting hardware that is required to hold the manual activation device 104/lock mechanism 106; the cargo door 20 does not need to include any openings or other holes required to hold the manual activation device 104/lock mechanism 106; the cargo door 20 does not need to have any features or designs needed to accommodate the manual activation device 104/lock mechanism 106. By placing the manual activation device 104/lock mechanism 106 remote to the cargo door 20 this allows the design of the cargo door 20 to be simplified. By placing the manual activation device 104/lock mechanism 106 remote to the cargo door 20 this allows the manufacturing process for the cargo door 20 to be simplified. By placing the manual activation device 104/lock mechanism 106 remote to the cargo door 20 and out of view, this allows the design, style, shape of the manual activation device 104/lock mechanism 106 to be changed easily and without severe repercussions. As such, by placing the manual activation device 104/lock mechanism 106 remote to the cargo door 20 this simplifies the cargo door 20 and reduces the cost of the cargo door 20.

In one arrangement, to provide security and prevent access to cargo hold 18, motorized activation device 92 is connected to a deactivation system 116. Deactivation system 116 serves to deactivate the motorized operation of latch mechanism 60. Deactivation system 116 may be a simple switch or button in the cab or cockpit of RV 12 that turns on and turns off operation of activation devices 92 and/or motorized members 78. In one arrangement, deactivation system 116 may be used to turn off, or lock, operation of all activation devices 92 and/or motorized members 78 simultaneously. In an alternative arrangement, deactivation system 116 may be used to turn off, or lock, operation of all activation devices 92 and/or motorized members 78 individually. This arrangement allows the driver or user to selectively allow the opening of specific cargo doors 20 while keeping other cargo doors 20 locked. This allows the user of RV 12 to lock cargo doors 20. The ability to individually lock certain cargo doors 20 while leaving other cargo doors 20 unlocked allows the user of RV 12 to lock cargo doors 20 that hold valuable items, such as luggage, that the user wants to prevent access to while allowing access to other cargo doors 20, such as cargo doors 20 that provide access to the plumbing station or generator. This is desirable when the RV 12 is parked overnight, or when the RV 12 is unattended.

Use of a lock mechanism 106 as manual activation device 104 provides a level of security as a user must have a key 108 matched to the lock mechanism 106 to open cargo door 20 in an unpowered or deactivated state (by deactivations system 116). This prevents anyone other than the owner from operating manual activation device 104 and gaining access to locked cargo hold 18.

As another manner and means of opening cargo door 20, the system 10 includes one or more remote control devices 118. Remote control devices 118 are formed of any suitable size, shape and design which serve to remotely open cargo door 20, either through wireless communication and/or through wired communication.

In one arrangement, remote control device 118 is configured to transmit a wireless control signal 120 over the air to RV 12. Wireless control signals 120 are received by an antenna 122 connected to a receiver 124 which is connected by an electronic network 126 of RV 12 to facilitate control of the cargo door 20. In one arrangement, electronic network 126 electrically connects deactivation system 116 to motorized members 78 and to activation devices 92. Electronic network 126 also connects receiver 124 to motorized members 78 such that when a wireless control signal 120 is transmitted by remote control device 118 and received by antenna 122 and receiver 124, the desired cargo door or doors 20 are opened by a signal being transmitted through electronic network 126 to the intended motorized member 78. In the arrangement shown, as one example, remote control device 118 includes a plurality of buttons 128, wherein each button is assigned to a cargo door 20. The addition of remote control devices 118, antenna 122, receiver 124 and electronic network 126 provides a third manner of opening cargo doors 20. That is, the cargo doors 20 may be opened by pressing a button 128 on remote control device 118 and opening the cargo door 20 by motorized member 78; by pressing activation device 92 and opening the cargo door 20 by motorized member 78; or by manually operating manual activation device 104. Notably, the term remote control device 118 may be construed to include a device dedicated to serve only to be used with RV 12, such as a conventional key fab used with many vehicles.

Alternatively, remote control device 118 may be construed broadly, and includes any device capable of transmitting a wireless control signal 120, such as users' smart phone, tablet or other handheld device or computing device. In this way, remote control device 118 may be an app or other software module that is installed on the user's handheld device, and "buttons 128" may be presented in a user interface within the software module. Remote control device 118 may include additional buttons 128 and functionalities that control additional motorized systems of RV 12, such as door locks, windows, or any other powered system. In one arrangement when remote control device 118 is a device having an interactive display, such as a smart phone having an application installed thereon, the buttons 128 may take the form of a visual display of the RV 12 with the cargo doors 20 displayed. In this arrangement, when the user presses or interacts with a cargo door 20, the remote control device 118 transmits a signal locking or unlocking the specified cargo door 20. This arrangement provides increased convenience and a visual double-check that the user is operating the correct cargo door 20. However, due to the fact that remote control devices 118, such as user's smartphone, often lose their charge, this increases the need to have an alternative manual manner of entering the cargo door 20 in the event that the user's remote control device 118 (e.g. a smartphone running an application) loses its charge and goes dead.

In an alternative arrangement or in addition to a wireless remote control device 118, a wired remote control device 118 is associated with the system and is configured to remotely facilitate control of the cargo doors 20. In one arrangement, wired remote control device 118 is electrically connected to electronic network 126 which electrically connects deactivation system 116 to motorized members 78 and to activation devices 92. Electronic network 126 connects wired remote control device 118 to motorized members 78 such that when a button 128 is pressed on wired remote control device 118 the desired cargo door or doors 20 are opened by a signal being transmitted through electronic network 126 to the intended motorized member 78. The addition of wired remote control device 118, in addition to wireless remote control device 18 provides a fourth manner of opening cargo doors 20. That is, the cargo doors 20 may be opened by pressing a button 128 on wired remote control device 118 and opening the cargo door 20 by motorized member 78; by pressing a button 128 on wireless remote control device 118 and opening the cargo door 20 by motorized member 78; by pressing activation device 92 and opening the cargo door 20 by motorized member 78; or by manually operating manual activation device 104.

In Operation:

When using RV 12 having RV door opening system 10 and it is desirable to access cargo hold 18 for one of countless reasons, a user goes to the location of the desired cargo door 20/cargo hold 18 and activates activation device 92. In the example where activation device 92 is a button 96, the user simply presses button 96 placed in the cargo door 20 itself or in the sidewall 16 of body 14 of RV 12. When button 96 is pressed, a signal is transmitted through electronic network 126 and activates motorized member 78 which causes latch mechanism 60 to unlatch and therefor allows post 66 out of opening 64. More specifically, when activated, motorized member 78 moves nose 84. This motion is translated to lever mechanism 72 that it is operatively connected to motorized member 78. As the lever mechanism 72 is engaged or moved by motorized member 78, the lever mechanism 72 pivots on a pivot point and causes tongue 70 to release or open opening 64. Once tongue 70 moves away from closing opening 64, post 66 is allowed to escape opening 64, thereby allowing for cargo door 20 to be opened. In one arrangement, once post 66 is released and allowed out of opening 64, opening/closing system 58 (such as a hydraulic or pneumatic cylinder) automatically moves cargo door 20 to an open position by applying a bias force. In this way, motorized member 78 is utilized to quickly, easily and conveniently open cargo door 20.

In another arrangement, wherein the system 10 includes the use of one or more remote control devices 118, when the user desires to open one or all cargo doors 20 wirelessly, the user acquires the remote control device 118, which may be a dedicated remote (such as a key fab) or an app on their cell phone, and the user activates the appropriate button 128 on the remote control device 118. In response to activation of the control or button 128 of remote control device 118, remote control device 118 transmits an appropriate wireless control signal 120. This wireless control signal 120 may be configured to open a specific cargo door 20, a plurality of cargo doors 20 or all cargo doors. The antenna 122 receives this wireless control signal 120 and transmits it to receiver 124. A signal is then transmitted through electronic network 126 to the appropriate motorized members 78 which opens the appropriate cargo doors 78 in the manner described herein. In this way a user wirelessly opens one or more cargo doors 78 using system 10.

However, when RV 12 is in an unpowered state, due to motorized member 78 requiring power to operate, or when motorized member 78 is broken, a user cannot simply activate the activation device 92 to open cargo door 20. In this situation, when the RV 12 is in an unpowered state, or when motorized member 78 is inoperable, the user can open cargo door 20 by operating manual activation device 104. In the example where manual activation device 104 is a lock mechanism 106 with a face 110 that faces downward from the underside 112 of RV 12, the user locates key 108. Next, the user locates the position of the face 110 of lock mechanism 106 in the underside of RV 12, whether it be in the undercarriage of RV 12, in the peripheral edge 32 of cargo hold 18, in the lower edge 46 of cargo door 20, or in any other location. Once located the user removes cover 114 exposing the face 110 of lock mechanism 106. Once cover 114 is removed, the user inserts key 108 and rotates it which causes portions of lock mechanism 106 to rotate which causes cable 100 to move within sheath 102. As cable 100 moves, this causes the lever mechanism 72 that is operatively connected to lock mechanism 106 to move. As the lever mechanism 72 moves, the lever mechanism 72 pivots on pivot point 76 and causes tongue 70 to release or open opening 64. Once tongue 70 as moved away from closing opening 64, post 66 is allowed to escape opening 64, thereby allowing for cargo door 20 to be opened. In one arrangement, once post 66 is released and allowed out of opening 64, opening/closing system 58 automatically moves cargo door 20 to an open position. In this way, manual activation device 104 is utilized to quickly, easily and conveniently open cargo door 20 when motorized member 78 is inoperable or when the RV 12 is in an unpowered state.

While the arrangement is shown and discussed herein where latch mechanism 60 is connected to body 14 or cargo hold 18 and the post 66 and post mechanism 68 is connected to cargo door 20, the inverse is hereby contemplated for use as well. That is, all parts and components of system 10 that are shown or described as connected to one of the cargo door 20 or cargo hold 18 are contemplated for use on the other of the cargo door 20 or cargo hold 18 without departing from the spirit or scope of the disclosure. That is, as an alternative arrangement, latch mechanism 60 is connected to cargo door 20 and the post 66 and post mechanism 68 is connected to body 14 or cargo hold 18.

Utility/Maintenance Vehicles:

While the description herein is used in association with a conventional RV 12, it is hereby contemplated that the system 10 may also be used with utility/maintenance vehicles 200, or simply utility vehicles 200.

Utility/maintenance vehicles 200 are any vehicle having a utility cabin or a utility box having a plurality of cargo holds 18 covered by cargo doors 20. Common examples include, but are not limited to: fire trucks, ambulances, work trucks, contractor trucks, repair vehicles, construction vehicles, any form of heavy equipment that includes cargo holds 18 and cargo doors 20, or any other vehicle having cargo holds 18 and cargo doors 20 or any pickup truck that includes a cargo hold, topper, cabinet, toolbox, fuel tank or other storage device positioned in or on its bed. In the arrangement shown, an example of a utility/maintenance vehicle 200 is presented that includes a plurality of cargo holds 18 covered by cargo doors 20 to which the system described herein applies.

Soft Close & Auto Close:

The door opening system 10 presented herein is applicable to both "soft close" latch mechanisms 60, as well as "standard close" latch mechanisms 60.

Soft close latch mechanisms 60 utilize a powered actuator that controls and moves latching structure of the latching mechanism 60 that facilitates powered and "soft" opening and/or closing of cargo door 20. The arrangement shown in FIGS. 4-9 and 10A and 10B depict a powered soft close latch mechanism 60 with an actuator that moves latching structure of the latching mechanism 60 laterally. As an example, in FIG. 10A the latching structure of the latching mechanism 60 is shown in an extended position ready to receive post 66 of post mechanism 68 for a soft close operation; whereas in FIG. 10B the latching structure of the latching mechanism 60 is shown in a retracted position with post 66 of post mechanism 68 held within opening 64 of latch mechanism 60. Soft close latch mechanisms 60 are a nice feature as they reduce and/or eliminate the user from forcing the cargo door 20 shut. In addition to a soft close latch mechanism 60, a powered opening/closing system 58 may be used to fully automate the opening and closing of cargo door 20, such as a powered hydraulic or pneumatic cylinder or a powered actuator. Alternatively, soft close latch mechanisms 60 may be used in association with an unpowered opening/closing system 58 that helps facilitate movement of cargo door 20, such as an unpowered hydraulic or pneumatic cylinder that counters the weight of cargo door 20.

Standard close latch mechanisms 60 utilize an unpowered actuator that controls and moves latching structure of the latching mechanism 60 that facilitates unpowered opening and/or closing of cargo door 20. Standard close latch mechanisms 60 are similar to the latch mechanisms 6 shown in FIGS. 4-9 and 10A and 10B however they utilize an unpowered actuator. Standard close latch mechanisms 60 require a user to forcing the cargo door 20 shut and/or apply a force to open the cargo door 20. Standard close latch mechanisms 60 often include springs as well as levers and cam surfaces to create geometry and forces that lock and unlock around post 66 of post mechanism 68. Like soft close latch mechanisms 60, standard close latch mechanisms 60 may be used in association with a powered or unpowered opening/closing system 58 to facilitate movement of cargo door 20.

While only soft close latch mechanisms 60 are shown in the figures, one of ordinary skill in the art would recognize that the system 10 presented herein may be modified to be used with standard close latch mechanisms 60.

From the above discussion it will be appreciated that the RV door opening system and method of use presented improves upon the state of the art.

Specifically, the RV door opening system and method of use presented: is easy to use; improves access to the cargo hold; operates in a powered and unpowered state; provides security; provides ease of access; provides an improved aesthetic appearance; eliminates the conventional mechanical handle mechanism; eliminates the need for a handle mechanism in the cargo door; eliminates costly parts; is safe to use; eliminates the need for a hole in the cargo door; provides a unique solution; is efficient to use; improves manufacturability; is cost effective; is durable; is robust; can be used with a wide variety of cargo doors; can be used with a wide variety of RVs; is relatively inexpensive; that has a long useful life; is high quality; is convenient; eliminates the need for costly repairs, among countless other advantages and improvements.

It will be appreciated by those skilled in the art that other various modifications could be made to the device without parting from the spirit and scope of this disclosure. All such modifications and changes fall within the scope of the claims and are intended to be covered thereby.

What is claimed:

1. A recreational or utility vehicle system comprising:
a body;
the body having a cargo hold;
a cargo door;
the cargo door configured to cover the cargo hold;
the cargo door configured to move between a closed position and an open position;
a latch mechanism operably connected to the cargo hold and the cargo door;
the latch mechanism configured to latch the cargo door in a closed position, and unlatch the cargo door to facilitate opening of the cargo door;
a motorized member operably connected to the latch mechanism;
the motorized member configured to unlatch the latch mechanism when activated;
an activation device electrically connected to the motorized member;
wherein when the activation device is operated, the motorized member operates to unlatch the latch mechanism;
a manual override system operably connected to the latch mechanism;
wherein when the manual override system is operated, the manual override system manually operates to unlatch the latch mechanism;
wherein when the recreational or utility vehicle is in a powered state, the latch mechanism is unlatched by operating the activation device thereby allowing the cargo door to be opened;
wherein when the recreational or utility vehicle is in an unpowered state, the latch mechanism is unlatched by operating the manual override system thereby allowing the cargo door to be opened;
wherein the activation device is a button positioned in the body of the recreational or utility vehicle, wherein the button is adjacent the cargo door and is operable from outside the recreational or utility vehicle.

2. The system of claim 1 wherein the motorized member is selected from the group consisting of a linear actuator, a solenoid, a pneumatic device and a hydraulic device.

3. The system of claim 1 wherein the manual override system is a lock mechanism operable by a matched key.

4. The system of claim 1 wherein the manual override system is a lock mechanism operable by a matched key; wherein the lock mechanism is accessible from below the cargo hold adjacent the cargo door; wherein the lock mechanism is covered by a protective cover to prevent deterioration of the lock.

5. The system of claim 1 further comprising a remote control device wirelessly connected to the motorized member and configured to wirelessly operate the motorized member.

6. A recreational or utility vehicle system comprising:
a body;
the body having a cargo hold;
a cargo door;
the cargo door configured to cover the cargo hold;
the cargo door configured to move between a closed position and an open position;
a latch mechanism operably connected to the cargo hold and the cargo door;
the latch mechanism configured to latch the cargo door in a closed position, and unlatch the cargo door to facilitate opening of the cargo door;
a motorized member operably connected to the latch mechanism;
the motorized member configured to unlatch the latch mechanism when activated;
an activation device electrically connected to the motorized member;
wherein when the activation device is operated, the motorized member operates to unlatch the latch mechanism;
a manual override system operably connected to the latch mechanism;

wherein when the manual override system is operated, the manual override system manually operates to unlatch the latch mechanism;
wherein when the recreational or utility vehicle is in a powered state, the latch mechanism is unlatched by operating the activation device thereby allowing the cargo door to be opened;
wherein when the recreational or utility vehicle is in an unpowered state, the latch mechanism is unlatched by operating the manual override system thereby allowing the cargo door to be opened;
wherein the manual override system is a lock mechanism operable by a matched key; wherein the lock mechanism is accessible from below the cargo hold adjacent the cargo door.

7. A recreational or utility vehicle system comprising:
a body;
the body having a cargo hold;
a cargo door;
the cargo door configured to cover the cargo hold;
the cargo door configured to move between a closed position and an open position;
a latch mechanism operably connected to the cargo hold and the cargo door;
the latch mechanism configured to latch the cargo door in a closed position, and unlatch the cargo door to facilitate opening of the cargo door;
a motorized member operably connected to the latch mechanism;
the motorized member configured to unlatch the latch mechanism when activated;
an activation device electrically connected to the motorized member;
wherein when the activation device is operated, the motorized member operates to unlatch the latch mechanism;
a manual override system operably connected to the latch mechanism;
wherein when the manual override system is operated, the manual override system manually operates to unlatch the latch mechanism;
wherein when the recreational or utility vehicle is in a powered state the latch mechanism is unlatched by operating the activation device thereby allowing the cargo door to be opened;
wherein when the recreational or utility vehicle is in an unpowered state the latch mechanism is unlatched by operating the manual override system thereby allowing the cargo door to be opened;
wherein the manual override system is connected to the latch mechanism by a cable, wherein the cable manually operates the latch mechanism when the manual override system is activated.

8. A recreational or utility vehicle system comprising:
a body;
the body having a cargo hold;
a cargo door;
the cargo door configured to cover the cargo hold;
the cargo door configured to move between a closed position and an open position;
a latch mechanism operably connected to the cargo hold and the cargo door;
the latch mechanism configured to latch the cargo door in a closed position, and unlatch the cargo door to facilitate opening of the cargo door;
a motorized member operably connected to the latch mechanism;
the motorized member configured to unlatch the latch mechanism when activated;
an activation device electrically connected to the motorized member;
wherein when the activation device is operated, the motorized member operates to unlatch the latch mechanism;
a manual override system operably connected to the latch mechanism;
wherein when the manual override system is operated, the manual override system manually operates to unlatch the latch mechanism;
wherein when the recreational or utility vehicle is in a powered state, the latch mechanism is unlatched by operating the activation device thereby allowing the cargo door to he opened;
wherein when the recreational or utility vehicle is in an unpowered state, the latch mechanism is unlatched by operating the manual override system thereby allowing the cargo door to be opened;
wherein the cargo door has a solid and continuous exterior surface without an opening for a handle therein.

9. A cargo door system for recreational or utility vehicle comprising:
a cargo door;
the cargo door having a solid and continuous exterior surface without an opening therein for a handle mechanism;
the cargo door operatively connected to a cargo hold, the cargo door configured to move between a closed position, wherein the cargo door covers the cargo hold, and an open position, wherein the cargo hold is accessible;
a latch mechanism operatively connected to the cargo door;
the latch mechanism configured to latch the cargo door in a closed position;
the latch mechanism configured to unlatch the cargo door to facilitate opening of the cargo door;
a motorized member operably connected to the latch mechanism;
the motorized member configured to unlatch the latch mechanism when activated;
an activation device electrically connected to the motorized member;
wherein when the activation device is operated, the motorized member operates to unlatch the latch mechanism;
a manual override system operably connected to the latch mechanism;
wherein when the manual override system is operated, the manual override system manually operates to unlatch the latch mechanism;
wherein when the recreational or utility vehicle is in a powered state, the latch mechanism is unlatched by operating the activation device thereby allowing the cargo door to be opened;
wherein when the recreational or utility vehicle is in an unpowered state, the latch mechanism is unlatched by operating the manual override system thereby allowing the cargo door to be opened.

10. The system of claim 9 wherein the motorized member is selected from the group consisting of a linear actuator, a solenoid, a pneumatic device and a hydraulic device.

11. The system of claim 9 wherein the activation device is a button in the body of the recreational or utility vehicle.

12. The system of claim 9 wherein the activation device is a button in the body of the recreational or utility vehicle, wherein the button is adjacent the cargo door and is operable from outside the recreational or utility vehicle.

13. The system of claim 9 wherein the manual override system is a lock operable by a key.

14. The system of claim 9 wherein the manual override system is a lock operable by a key; wherein the lock is accessible from below the cargo hold adjacent the cargo door.

15. The system of claim 9 wherein the manual override system is a lock operable by a key; wherein the lock is accessible from below the cargo hold adjacent the cargo door;
   wherein the lock is covered by a protective cover to prevent deterioration of the lock.

16. The system of claim 9 wherein the manual override system is connected to the latch mechanism by a cable, wherein the cable manually operates the latch mechanism when the manual override system is activated.

17. The system of claim 9 further comprising a remote control device wirelessly connected to the motorized member and configured to wirelessly operate motorized member.

* * * * *

UNITED STATES PATENT AND TRADEMARK OFFICE
CERTIFICATE OF CORRECTION

| | | |
|---|---|---|
| PATENT NO. | : 10,246,911 B2 | |
| APPLICATION NO. | : 15/610899 | |
| DATED | : April 2, 2019 | |
| INVENTOR(S) | : Albert Marasco | |

It is certified that error appears in the above-identified patent and that said Letters Patent is hereby corrected as shown below:

In the Claims

In Column 17, Line 54, Claim 8 should read as follows:
8. A recreational or utility vehicle system comprising:
a body;
the body having a cargo hold;
a cargo door; the cargo door configured to cover the cargo hold;
the cargo door configured to move between a closed position and an open position;
a latch mechanism operably connected to the cargo hold and the cargo door;
the latch mechanism configured to latch the cargo door in a closed position, and unlatch the cargo door to facilitate opening of the cargo door;
a motorized member operably connected to the latch mechanism;
the motorized member configured to unlatch the latch mechanism when activated;
an activation device electrically connected to the motorized member;
wherein when the activation device is operated, the motorized member operates to unlatch the latch mechanism;
a manual override system operably connected to the latch mechanism;
wherein when the manual override system is operated, the manual override system manually operates to unlatch the latch mechanism;
wherein when the recreational or utility vehicle is in a powered state, the latch mechanism is unlatched by operating the activation device thereby allowing the cargo door to be opened;
wherein when the recreational or utility vehicle is in an unpowered state, the latch mechanism is unlatched by operating the manual override system thereby allowing the cargo door to be opened;
wherein the cargo door has a solid and continuous exterior surface without an opening for a handle therein.

Signed and Sealed this
Seventh Day of May, 2019

Andrei Iancu
*Director of the United States Patent and Trademark Office*